United States Patent
Paulson

[11] 4,185,651
[45] Jan. 29, 1980

[54] INERTIALLY TRIGGERED FLUID FLOW CONTROL DEVICE

[76] Inventor: Eugene K. Paulson, 351 Rosemont Dr., Santa Clara, Calif. 95051

[21] Appl. No.: 811,520

[22] Filed: Jun. 30, 1977

[51] Int. Cl.² ................................ F16K 17/36
[52] U.S. Cl. ....................... 137/38; 200/61.45 R
[58] Field of Search ................. 137/38, 39, 43; 200/61.45 R, 61.52

[56] References Cited
U.S. PATENT DOCUMENTS

| | | |
|---|---|---|
| 406,290 | 7/1889 | Murdock . |
| 1,241,888 | 10/1917 | Safford .................. 200/61.52 X |
| 2,017,274 | 10/1935 | Breitenstein ............ 200/61.52 |
| 2,283,303 | 5/1942 | Whitlock . |
| 2,615,461 | 10/1952 | Crow . |
| 2,637,331 | 5/1953 | Sullivan . |
| 2,812,770 | 11/1957 | Sullivan . |
| 2,853,089 | 9/1958 | Bair . |
| 3,389,715 | 6/1968 | Hebard ..................... 137/43 |
| 3,628,550 | 12/1971 | Cirillo ...................... 137/38 |
| 3,769,472 | 10/1973 | Bell ...................... 200/61.45 R |
| 3,994,360 | 11/1976 | Leibold ................... 137/38 X |

FOREIGN PATENT DOCUMENTS 544427  9/1922  France .................................. 137/43
470171  8/1937  United Kingdom ................ 137/43

Primary Examiner—Robert G. Nilson
Attorney, Agent, or Firm—Townsend and Townsend

[57] ABSTRACT

A device for controlling fluid flow wherein a movable ball at a central location on a concave surface of a support prevents upward movement of an actuating element, such as a valve stem to prevent a specific function, such as the closure of a valve, until the ball moves laterally along the concave surface. A spring biases the element upwardly but the weight of the ball is greater than the bias force of the spring. When the ball moves laterally, the element moves upwardly through the concave surface and projects above it to prevent return of the ball to the central position on the concave surface until the stem is again forced downwardly, such as by a pivotal lever engaging a projection on the element to shift the latter. Means is provided in the device for adjusting the bias force of the spring.

11 Claims, 3 Drawing Figures

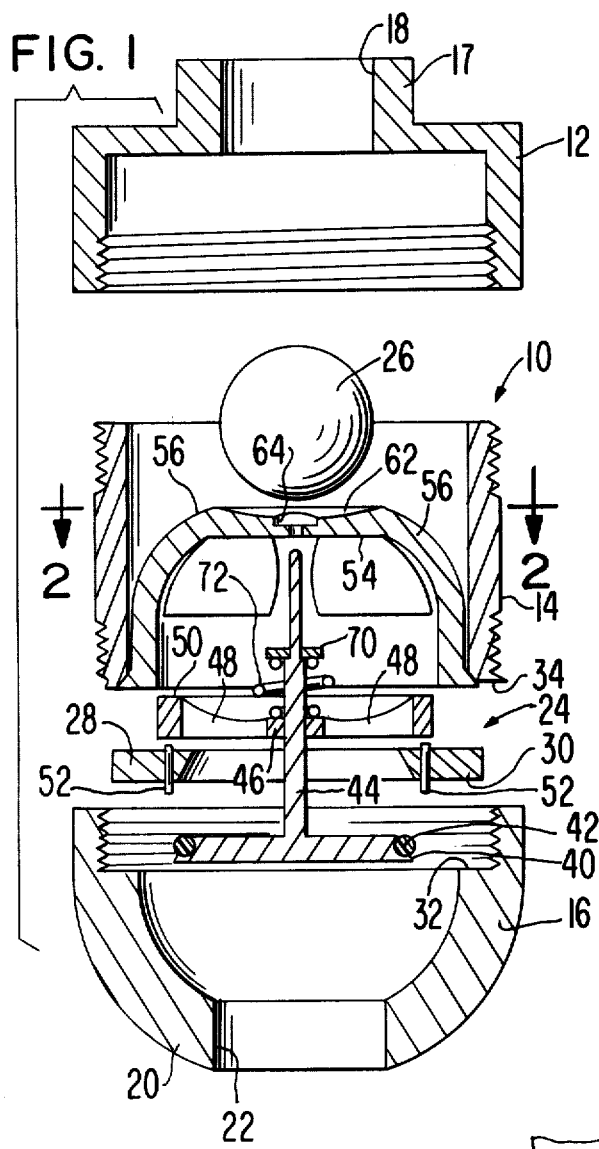
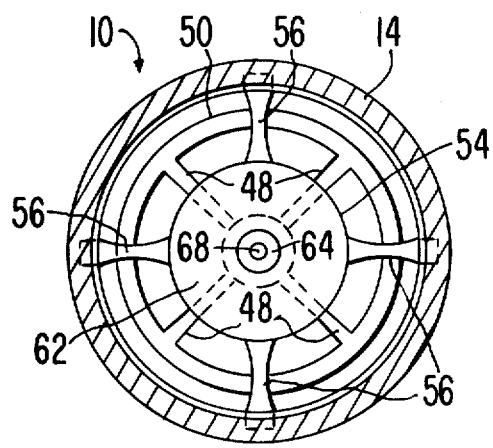
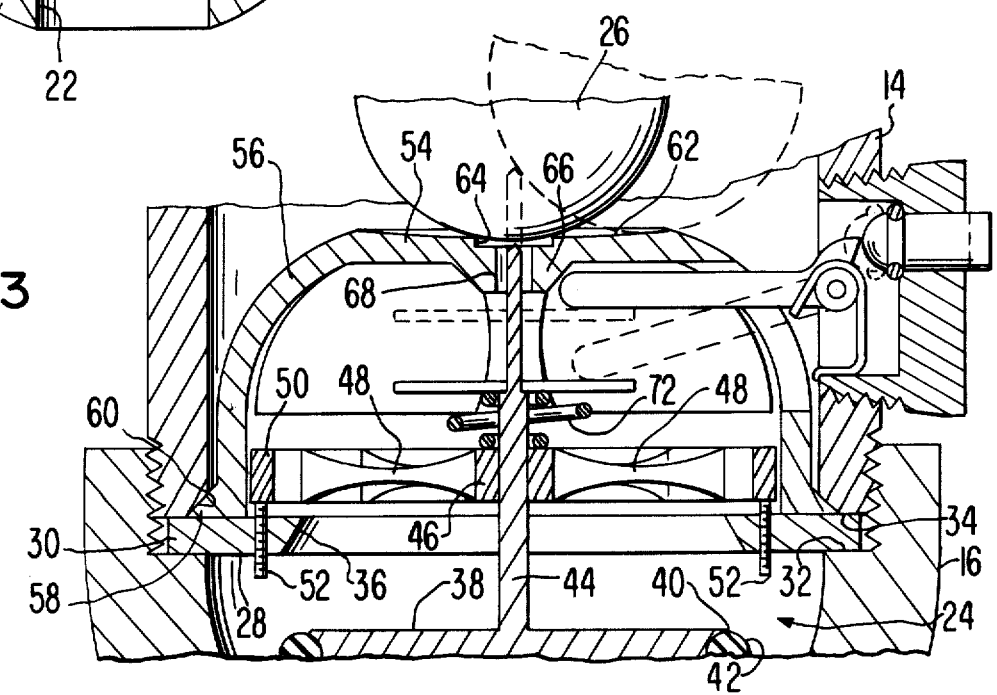

INERTIALLY TRIGGERED FLUID FLOW CONTROL DEVICE

This invention relates to improvements in safety devices for control purposes and, more particularly, to a device for immediately performing a specific function, such as interrupting a fluid flow, in response to the occurrence of an unusual terrestial event, such as an earthquake.

BACKGROUND OF THE INVENTION

It is well-known that earthquake or other violent earth tremors can cause damage and loss of life due to fires which are started when natural gas pipes are broken or ruptured. Over the years, attempts have been made to provide a safety cut-off valve for controlling flow of natural gas during calamities. For the most part, these attempts have not been successful in providing a safety device of simple and rugged construction and one of relatively few parts. A need has, therefore, arisen for an improved safety control device having these characteristics and suitable for use in protecting a home or other structure during an earthquake from fire and other hazards.

SUMMARY OF THE INVENTION

The present invention is directed to a control device which satisfies the foregoing need wherein the device has a ball for holding a first of a pair of relatively shiftable elements in a fixed position with respect to the second element so long as the device is not subject to vibrations or shocks of the type caused by earthquakes or other terrestial events. The ball, when subjected to such vibrations or shocks, is movable out of an operative position permitting relative movement of the elements, causing a specific function to be performed, such as the closing of a fluid valve or the closing of an electrical switch. As hereinafter set forth, the control device of this invention will be described with respect to the control of a flow of fluid, such as natural gas.

To this end, the device includes a housing formed of several parts joined together to enclose a valve and valve seat, with the valve having a stem extending into a passage in the base of a support for the ball itself. The support has a concave upper surface and a recess for centering the ball above the valve stem. The ball normally engages the upper end of the valve stem and the weight of the ball prevents upward movement of the stem and thereby closing of the valve even though the valve is biased upwardly by a spring coupled with the stem. When the ball moves laterally, the stem moves upwardly past the concave surface, whereupon the valve moves into closing relationship to the valve seat. The upper end of the valve stem remains above the concave surface, thereby preventing return of the ball until the valve stem is retracted, i.e., the valve is manually opened. This is accomplished by the use of a pivotal lever inside the housing for engaging a projection on the valve stem to retract it when a pushbutton is depressed from outside the housing. Means is also provided in the housing to adjust the bias force of the spring so that the device can be made as sensitive as is desired.

The primary object of this invention is to provide an improved control device for use in performing a specific control function, such as the closure of a fluid valve, wherein the device is simple and rugged in construction, is easy to assemble and disassemble, and operates to hold a first element in an operative position relative to a second element so long as a ball is centered with respect to a concave surface above a spring biased stem coupled to one of the elements.

Another object of this invention is to provide a control device of the type described, wherein the device is provided with a ball support mounted on spaced legs above a first element and the support is provided with means for shiftably mounting a second element so that, when a spring biases the second element upwardly, the second element will move relative to the first element to cause a specific function to be performed when the ball moves laterally, such as when vibrations or shocks are exerted on the device itself.

Other objects of this invention will become apparent as the following specification progresses, reference being had to the accompanying drawings for an illustration of the invention.

In the drawings:

FIG. 1 is an exploded view in section of the control device of the present invention;

FIG. 2 is a cross-sectional view taken along line 2—2 of FIG. 1; and

FIG. 3 is an enlarged, fragmentary, cross-sectional view of the device showing the ball in an operative position in which the valve is held open.

The control device selected to illustrate the teachings of the present invention is one which is used to control the flow of a fluid, such as natural gas, through a flow line. The device is broadly denoted by the numeral 10 and includes a housing formed of a top member 12, a central tubular member 14, and a bottom member 16. Top member 12 has a neck 17 provided with an opening 18 for connection with a pipe or tube. Bottom member 16 also has a neck 20 provided with an opening 22 for connection with a pipe or tube. Central member 14 is threaded at opposite ends thereof for threaded connection with the lower end of top member 12 and the upper end of bottom member 16. FIG. 3 shows the bottom member threaded with the central member. For purposes of illustration, the top, central and bottom members are made of metal; however, they can be of other materials, such as plastic, if desired, so long as they form a fluid-tight housing.

Device 10 is provided with valve means 24 therein and a control ball 26 for holding the valve means in an open condition when the ball is centrally located within central member 14 as shown in FIG. 3. To this end, valve means 24 includes an annular valve seat element 28 provided with an outer periphery 30 which is disposed between a shoulder 32 on bottom member 16 (FIG. 1) and a lower face 34 on central member 14 when these two members are connected together as shown in FIG. 3. In this way, element 28 is held in place against movement relative to the central and bottom members. Element 28 has a beveled, inner, peripheral surface 36 defining a valve seat for a valve member 38, the latter having a beveled outer surface 40 (FIG. 1) provided with an O-ring 42 thereon for engaging beveled inner surface 36 of the valve seat element 28 to close valve means 24. FIGS. 1 and 3 show valve member 38 in its open position.

A valve stem 44 is rigidly connected to valve member 38 at the center thereof. Stem 44 passes upwardly through a collar 46 and is shiftable therethrough. Collar 46 has a number of spaced legs 48 radiating therefrom and connected at their outer ends to a ring 50, the latter resting on a number of adjustment screws 52 threadably mounted in valve seat element 28. For purposes of illustration, there are four legs 48 as shown in FIG. 2, the legs being sufficiently spaced apart to allow fluid to flow therebetween. While only two screws 52 are shown in FIG. 3, typically there will be three or possibly four such screws. If three screws are used, they will be spaced 120° apart. Four such screws will be spaced 90° apart.

A circular support 54 has a number of spaced legs 56 secured thereto, each leg 56 being curved so that it extends outwardly and then downwardly from support 54 as shown in FIGS. 1 and 3. The lower end of each leg 56 has a lateral projection 58 which fits under the beveled surface 60 of central member 14 when the latter is threadably connected to the upper end of bottom member 16 to hold leg 56 in place. When so mounted, legs 56 position support 54 in vertically spaced relationship above collar 46 as shown in FIG. 3.

Support 54 has a concave upper surface 62 on which ball 26 is disposed. Further, support 54 has a countersunk recess 64 at the center of concave surface 62 to releasably retain ball 26 centrally located. This is achieved because the ball engages the angular upper edge defining the upper boundary of recess 64 as shown in FIG. 3. A slight lateral force is required to disengage the ball from engagement with this annular upper edge; whereas, without the edge, the ball would be only in rolling contact with concave upper surface 62 and would not easily remain centered.

Support 54 is provided with a boss 66 having a passage 68 therethrough for receiving the upper end of valve stem 44 as shown in FIG. 3. Valve stem 44 is shiftable in passage 68 and can extend upwardly of recess 64 and concave surface 62.

Valve stem 44 has a disk-like projection 70 secured thereto below its upper end. A coil spring 72 normally under compression is disposed between the upper face of collar 46 and the lower face of annular projection 70. This causes valve stem 44 and thereby valve member 38 to be biased upwardly. However, the bias force of the spring is less than the weight of ball 26 so that, when the ball is in place as shown in FIG. 3, it holds valve stem 44 against upward movement; thus, valve member 38 is held in the open position shown in FIG. 3 in spaced relationship to valve seat element 28.

A lever 74 (FIG. 3) is pivotally mounted by a pin 76 on a fitting 78 which is threaded into a hole 80 in the side of the housing. A spring 82 biases lever 74 in a clockwise sense when viewing FIG. 3 into the full line position, but the spring allows the lever to pivot to the dashed line position thereof to retract valve stem 44 when thumb or finger pressure is applied to a pushbutton 84 shiftably received within an opening 86 through the outer end wall 88 of fitting 78. The inner end of the pushbutton engages a projection 90 on lever 74 to move it in a counter-clockwise sense when viewing FIG. 3. An O-ring seal 92 near the inner end of the pushbutton normally engages the inner face of end wall 88 to seal the junction therebetween.

In operation, control device 10 will be assembled with central member 14 connected at its upper end to top member 12 and at its lower end to bottom member 16. Suitable pipes or tubes will be connected to top and bottom members 12 and 16 at openings 18 and 22, respectively, and ball 26 will be centrally located on concave surface 62 in the manner shown in FIG. 3. In this position, the ball holds valve stem 44 from rising due to the bias force of spring 72. In this condition, valve member 38 is spaced from beveled inner surface 36 and valve means 24 is in an open condition. Thus, a fluid such as natural gas can flow through device 10 inasmuch as the valve is open and the spacing of legs 48 and 56 permit fluid flow past collar 46 and support 54. The device will, of course, be mounted in the vertical position.

If an earthquake or earth termor occurs, vibration will be transmitted to device 10 and will cause ball 26 to move laterally by rolling out of engagement with the annular upper edge defining the upper boundary of recess 64. When this occurs, coil spring 72 forces valve stem 44 upwardly, causing valve member 38 to move toward valve seat element 28 until O-ring 42 engages beveled inner surface 36 closing the valve. The upper end of valve stem 44 projects above the concave surface 62; thus, any tendency of ball 26 to return to its central position shown in FIG. 3 is prevented. The upper end of valve stem 44 holds ball 26 at one side of recess 64, such as in the dashed line position of FIG. 3, and valve member 38 remains in the closed condition. The ball is still in recess 64 even though the ball is near the outer periphery of the recess. Thus, the ball will return to its full line position of FIG. 3 when valve stem 44 is retracted under the influence of lever 74 as pushbutton 84 is pressed inwardly. This will reset device 10.

Device 10, therefore, provides a safety measure which, for instance, can be placed in a natural gas line leading to a residence. For instance, the device will be placed immediately downstream of a gas meter of a residence to prevent flow of natural gas to gas pipes under the residence which might become ruptured and cause a fire hazard. No such fire hazard will occur because the gas will be shut off before it reaches the residence.

While device 10 has been described as a valve, it is not to be limited to this use. Device 10 can have other applications, if desired. For instance, it can be made to provide electrical switching action, such as the closing or opening of an electrical switch when the ball moves out of the full line position of FIG. 3. For instance, elements 28 and 38, instead of being a valve seat and a valve member, respectively, can be two elements of an electrical switch which is closed when the ball moves out of the full line position of FIG. 3. The device could also be made in the form of an electrical switch which opens when the ball moves out of the full line position. Thus, the device is suitable for use in a number of applications which require a pair of relatively shiftable actuating elements which perform a specific function when they move relative to each other.

I claim:

1. A control device comprising: a housing having a fluid flow path therethrough; a valve in the housing and including a valve member provided with a valve stem, said valve member being movable from a first position closing said path to a second position opening said path; means biasing the valve and valve stem in an upward direction; a ball; means including a plurality of spaced legs for supporting the ball in an operative location in the housing above the valve stem, said legs extending outwardly and downwardly from the zone at which the ball is supported, said housing having means for supporting the lower ends of the legs, said fluid flow path extending between the legs, the weight of the ball being greater than the bias force of said bias means, said ball being operable to hold said valve member in one of said positions and being movable laterally of said operative location in response to a force exerted on the ball, said valve stem movable upwardly of the support means when the ball moves laterally to cause the valve member to move from said one position to the other position.

2. A control device comprising: a housing having a fluid flow path therethrough; a valve in the housing and including a valve member provided with a valve stem, said valve member being movable from a first position closing said path to a second position opening said path; means biasing the valve and valve stem in an upward direction; a collar above the valve member, said stem extending through the collar for support thereby, said collar having a plurality of spaced legs extending outwardly therefrom, and a ring secured to the outer ends of the legs, said housing having means therein for supporting the ring, said path extending between adjacent legs; a ball; means supporting the ball in an operative location in the housing above the valve stem, the weight of the ball being greater than the bias force of said bias means, said ball being operable to hold said valve member in one of said positions and being movable laterally of said operative location in response to a force exerted on the ball, said valve stem movable upwardly of the support means when the ball moves laterally to cause the valve member to move from said one position to the other position.

3. A control device as set forth in claim 2, wherein said valve includes a valve seat member provided with a central aperture therethrough, said valve being movable into engagement with said valve seat member when the valve moves into said second position.

4. A control device as set forth in claim 3, wherein said bias means includes a coil spring surrounding said valve stem.

5. A control device as set forth in claim 4, wherein said valve means is provided with means for adjusting the bias force of said coil spring.

6. A control device as set forth in claim 5, wherein said adjustment means includes a number of spaced screws threadably coupled to the valve stem having a lateral projection thereon above said collar, said spring being between said collar and said lateral projection.

7. A control device comprising: a housing having a fluid flow path therethrough; a valve in the housing and including a valve member provided with a valve stem, said valve member being movable from a first position closing said path to a second position opening said path; means biasing the valve and valve stem in an upward direction; a ball; means supporting the ball in an operative location in the housing above the valve stem, the weight of the ball being greater than the bias force of said bias means, said ball being operable to hold said valve member in one of said positions and being movable laterally of said operative location in response to a force exerted on the ball, said valve stem movable upwardly of the support means when the ball moves laterally to cause the valve member to move from said one position to the other position; and means shiftably carried by the housing for resetting the valve member to said one position to permit the ball to return to said operative position.

8. A control device as set forth in claim 7, wherein said resetting means includes a fitting removably coupled to the housing, a lever pivotally mounted on the fitting, and a pushbutton carried by the fitting and engageable with the lever to shift the same.

9. A control device comprising: a pair of relatively shiftable elements, one of the elements being movable relative to the other element from a first position to a second position above the first position; means biasing said one element toward said second position; a ball; means including a plurality of spaced legs for supporting the ball in an operative location above the elements, the legs extending outwardly and downwardly from the zone at which the ball is supported, a first of said elements having means for supporting the lower ends of the legs, the weight of the ball being greater than the bias force of said bias means, said ball being movable laterally of said operative location in response to a force exerted on the ball, said one element movable upwardly of the support means when the ball moves laterally to cause the one element to move from said first position to said second position.

10. A control device comprising: a pair of relatively shiftable elements, one of the elements being movable relative to the other element from a first position to a second position above the first position; means biasing said one element toward said second position; a ball; means supporting the ball in an operative location above the elements, the weight of the ball being greater than the bias force of said bias means, said ball being movable laterally of said operative location in response to a force exerted on the ball, said one element movable upwardly of the support means when the ball moves laterally to cause the one element to move from said first position to said second position; and means coupled with said bias means for adjusting the bias force thereof.

11. A control device comprising: a pair of relatively shiftable elements, one of the elements being movable relative to the other element from a first position to a second position above the first position; means biasing said one element toward said second position; a ball; means supporting the ball in an operative location above the elements, the weight of the ball being greater than the bias force of said bias means, said ball being movable laterally of said operative location in response to a force exerted on the ball, said one element movable upwardly of the support means when the ball moves laterally to cause the one element to move from said first position to said second position; a support adjacent to said elements; and means shiftably mounted on the support for resetting said one element to said first position.

* * * * *